R. W. ANDREWS.
Coffee Pot.
No. 10,616.
Patented March 7, 1854.
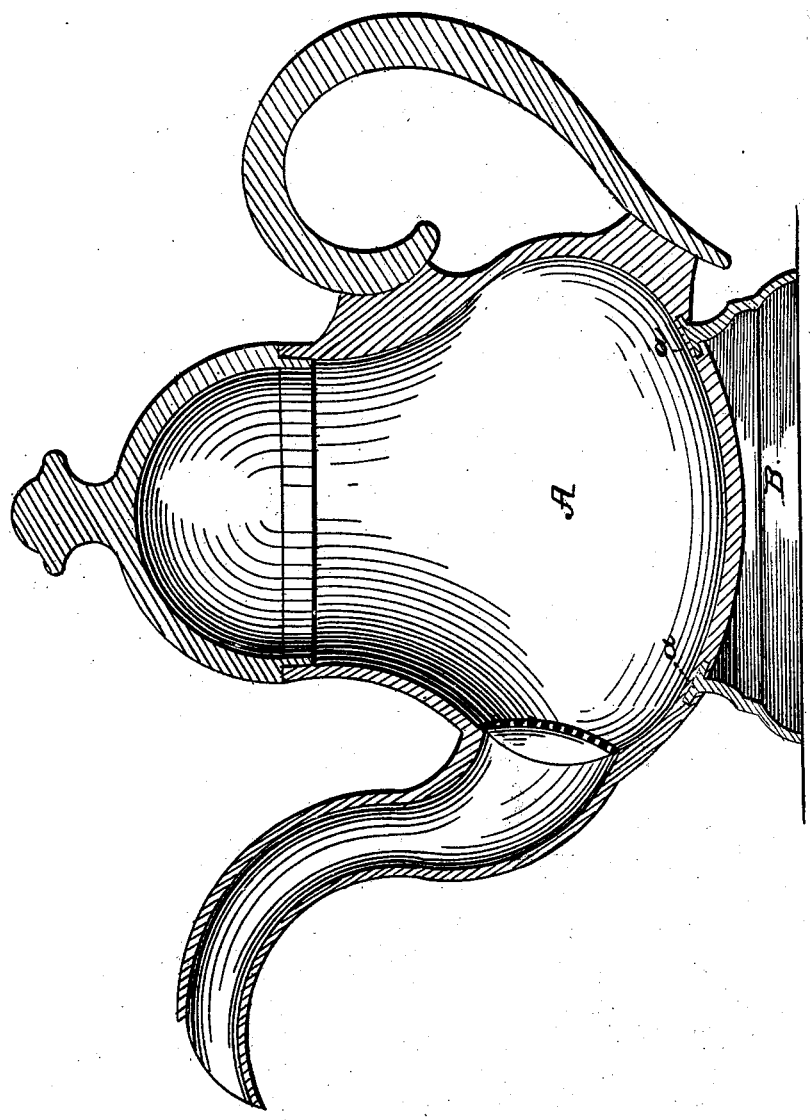

UNITED STATES PATENT OFFICE.

ROBERT W. ANDREWS, OF STAFFORDVILLE, CONNECTICUT.

BRITANNIA TEA AND COFFEE POT.

Specification of Letters Patent No. 10,616, dated March 7, 1854.

*To all whom it may concern:*

Be it known that I, ROBERT W. ANDREWS, of Staffordville, in the county of Tolland and State of Connecticut, have invented a new and useful Improvement in Britannia Tea-Pots or Coffee-Pots or other Britannia Vessels which may be Exposed to the Action of Fire Heat; and I do hereby declare that the following is a full and exact description thereof, reference being had to the accompanying drawing, making a part of this specification.

It is well known that the projecting ledge at the bottom of a Britannia tea pot (or coffee pot) is frequently melted off, by placing the said vessel upon hot coals, or a hot stove, to keep its contents warm, which accident generally renders the said vessel valueless for use.

My improvement consists in a sure mode of preventing such a casualty; viz: by first constructing the supporting ledge of a Britannia vessel, of iron, or other metal not injuriously affected by ordinary degrees of fire heat—and then casting the said vessel upon the said ledge.

In the accompanying drawing, A, is the body of a tea pot and B, is its supporting ledge: *a, a,* are flanges at the upper extremity of the ledge B, which are embraced within the bottom of the tea pot.

The ledge B, may be made of a plain, or an ornamental shape, as may be preferred.

What I claim as my invention and desire to secure by Letters Patent, is—

A tea pot, coffee pot, or other vessel, composed of a supporting ledge, or base, of iron (or other metal which is not melted by ordinary degrees of fire heat) combined with a body of Britannia metal, substantially in the manner and for the purpose herein set forth.

The above specification of my improvement in Britannia tea pots and coffee pots, or other Britannia vessels exposed to the action of fire heat, signed this 12 day of March 1853.

ROBERT W. ANDREWS.

Witnesses:
   E. G. HYDE,
   GEO. D. NETTLETON.